(12) United States Patent
Graham

(10) Patent No.: US 7,237,573 B1
(45) Date of Patent: Jul. 3, 2007

(54) HIGH PRESSURE, LOW FLOW RATE FLUID FLOW CONTROL

(76) Inventor: Steven H. Graham, 425 Applan Way, El Sobrante, CA (US) 94803

( * ) Notice: Subject to any disclaimer, the term of this patent is extended or adjusted under 35 U.S.C. 154(b) by 0 days.

(21) Appl. No.: 11/179,303

(22) Filed: Jul. 12, 2005

Related U.S. Application Data

(62) Division of application No. 10/390,142, filed on Mar. 18, 2003, now abandoned.

(51) Int. Cl.
*F15D 1/02* (2006.01)

(52) U.S. Cl. .......................... 138/43; 138/46

(58) Field of Classification Search .................. 138/43, 138/46
See application file for complete search history.

(56) References Cited

U.S. PATENT DOCUMENTS

| | | | | |
|---|---|---|---|---|
| 1,645,601 A | * | 10/1927 | Lee ................ | 251/122 |
| 1,754,138 A | * | 4/1930 | Agee .............. | 251/121 |
| 1,957,829 A | * | 5/1934 | Greenwald ......... | 138/41 |
| 2,324,360 A | * | 7/1943 | Camerota ........... | 138/43 |
| 2,341,394 A | * | 2/1944 | Sloan .............. | 251/120 |
| 2,658,529 A | * | 11/1953 | Hensley ............ | 138/46 |
| 3,095,006 A | * | 6/1963 | Smith .............. | 137/269.5 |
| 3,252,480 A | * | 5/1966 | Odendahl et al. ..... | 137/625.3 |
| 3,532,104 A | * | 10/1970 | Hoen ............... | 137/115.1 |
| 3,645,494 A | * | 2/1972 | Stelzer ............ | 251/121 |
| 3,908,698 A | * | 9/1975 | Baumann ........... | 137/625.3 |
| 3,971,411 A | * | 7/1976 | Baumann ........... | 137/625.3 |
| 4,044,991 A | * | 8/1977 | Waller ............. | 251/122 |
| 4,044,992 A | * | 8/1977 | Jukoff ............. | 251/126 |
| 4,632,359 A | * | 12/1986 | Tooth .............. | 251/126 |
| 5,527,433 A | * | 6/1996 | Begemann et al. ..... | 162/216 |
| 7,017,611 B2 | * | 3/2006 | Schmitt ............ | 138/43 |

* cited by examiner

*Primary Examiner*—James Hook
(74) *Attorney, Agent, or Firm*—Howard Cohen

(57) ABSTRACT

An adjustable high pressure, low flow metering valve provides a sleeve extending about a restrictor shaft, the sleeve having a narrow helical groove formed in the inside diameter. A restrictor shaft within the sleeve encloses the groove and forms a sealed helical flow channel. The length of the flow channel is varied by withdrawing the restrictor shaft in the sleeve, whereby only a selected axial extent of the groove is enclosed by the sleeve to form a confined flow path. The shaft is provided with a threaded engagement in the body of the metering valve, so that rotation of an adjustment knob provides extremely fine control of the length of the flow path, and thus highly accurate selection of the flow resistance.

3 Claims, 4 Drawing Sheets

HIGH PRESSURE, LOW FLOW RATE FLUID FLOW CONTROL

CROSS-REFERENCE TO RELATED APPLICATIONS

This application is a division of Ser. No. 10/390,142, filed Mar. 18, 2003, now abandoned.

FEDERALLY SPONSORED RESEARCH

Not applicable.

SEQUENCE LISTING, ETC ON CD

Not applicable.

BACKGROUND OF THE INVENTION

1. Field of the Invention

The present invention relates to fluid flow control, and, more particularly, to an improved method and apparatus to generate extremely low flow rates at high pressures that are accurately regulated for use in liquid chromatography and mass spectrometry.

2. Description of Related Art

In liquid chromatography, the liquid (solvent) flow rates generally used are between 100 μliters/min and 10 ml/min. However, more widespread use of capillary and micro-bore columns, as well as new applications such as combining liquid chromatography with mass spectrometry has created a requirement for flow rates that are as much as 100 times lower than the above mentioned flow rates. Very few HPLC pumps are capable of delivering accurate, stable flow rates in this range, and those that can do so are extremely expensive. As a result, most manufacturers have adopted a method known as flow splitting to achieve low flow rates with conventional high pressure liquid chromatography pumps. In the prior art, flow splitting is accomplished by using a tee to split the flow into two paths. Capillary tubes of different lengths and/or diameters are used on each path to create different fluid resistance in each path. Because these flow rates are all in the laminar flow regime, the resulting flow rates in each path can be found from the following relation:

$$\Delta P = \frac{\mu L Q}{d^4}$$

where P is pressure, μ is dynamic viscosity, L is capillary flow length, Q is flow rate, and d is effective capillary diameter.

The significant disadvantages of prior art include:

Capillary tube is easy to clog.

Split ratios may change during a chromatographic run because of changes in fluid viscosity that occur during the run. This may occur because the volume in the capillary tubing can be large enough that the composition of solvents can become different in the two legs when the pre-split composition is changing.

Difficult to adjust split flow ratio. It is necessary to cut the tubing to different lengths to adjust the split ratio. This is difficult to do because the capillary usually closes off due to crimping in the cutting process available to most chromatographers in the lab, and thus the fluid resistance changes unpredictably. Also, it is necessary to cut and join additional pieces of tubing to add resistance. This is a troublesome and time consuming process because of the small tube and fitting size.

Verifying the flow rate is extremely difficult. There are no commercially available flow meters that work at these low flow rates. Measuring flow rates as low as 100 nanoliters per minute must be done by weighing the effluent on the low path side over a known time interval. This is very time intensive. Using traditional methods, such as pressure drop through a known capillary, do not work because the viscosity of the fluids is often changing over time, and is unknown.

When the capillary analytical column is added to the low flow path, the split ratio is changed. The resistance of analytical columns is usually unknown, and will change with a change in solvent viscosity. Thus, it is necessary for the user to measure flow rates after adding the column to the flow splitter.

BRIEF SUMMARY OF THE INVENTION

The present invention generally comprises a method and apparatus for controlling and regulating the high pressure, low flow systems used in HPLC and the like.

A major aspect of the invention is the design of an adjustable high pressure, low flow metering valve. Other prior art devices have attempted to use orifice metering. This approach works well at high flow rates, but is unstable at these low flows and high pressures. Even a change in diameter of one millionth of an inch in the orifice diameter will produce an unacceptable change in back pressure. The present invention provides a sleeve that extends about a restrictor shaft, the sleeve having a narrow helical groove formed in the inside diameter thereof. A restrictor shaft is disposed within the sleeve in a press fit to enclose the groove and form a sealed helical flow channel that approximates a very small diameter capillary with a rather long path length. The long path tends to negate variations in effective diameter over the length of the flow path. The adjustment in fluid resistance is made by adjusting the length of the flow path. This is accomplished by changing the length of engagement of the restrictor shaft with the helical flow path created between the shaft and the bore. The length of the flow channel is varied by withdrawing the restrictor shaft in the sleeve, whereby only a selected axial extent of the groove is enclosed by the sleeve to form a confined flow path. The shaft is provided with a threaded engagement in the body of the metering valve, so that rotation of an adjustment knob provides extremely fine control of the length of the flow path, and thus highly accurate selection of the flow resistance.

The flow path is a groove having a 60° triangular cross-section which is provided to resist clogging. This groove has a flow resistance approximately the same as a tubular path having a diameter that fits within the 60° triangle, yet the triangular configuration permits the passage of particulates larger than the diameter of the tubular path.

Changes in the effective diameter that might otherwise be created by the engagement of the shaft and bore are minimized by creating a press fit of the shaft in the sleeve that induces compressive stress levels higher than the maximum operating pressure (5000 psi), and yet which are below the stress level at which long term creep is significant (as determined by the so-called 1000 hour modulus of the outer tube material). Furthermore, the adjustable device is inherently self-cleaning: contamination in the flow path is flushed out when the restrictor shaft is retracted and the groove is exposed.

A further aspect of the invention is a method and apparatus for an adjustable metering valve. Placing a fixed fluid resistor element on the low flow path, and a variable fluid resistor (adjustable metering valve) on a parallel, high flow rate path, the chromatographer can adjust the split flow ratio to virtually any ratio desired. For example, if the user requires nanoliter flow rates, a high fixed resistance cartridge is selected for the low flow rate path that provides a reasonable back pressure at the desired flow rate (say 1000 psi at 100 nanoliters per minute—it is important not to exceed the maximum or minimum pressure limits of the pump). Then the exact desired flow rate through the low flow path is obtained by means of the adjustable resistance valve in the high flow path. When the metering valve is adjusted to 1000 psi back pressure, the resistor chosen in this example will provide exactly 100 nanoliters per minute of flow. Because the volume in the fixed resistor and adjustable resistance valve is negligible compared to the flow rate and residence time in each respective path, the solvent composition and viscosity differences in each path are negligible (less than 1%).

Another aspect of the invention is a flow meter that can measure the flow rates on both pathways. A high pressure pump feeds a parallel circuit layout, one branch having fixed resistance, a pressure transducer, and an HPLC analytical column. The other branch includes a fixed resistance, another pressure transducer, and the adjustable resistance valve. Because flow rates are laminar, the flow rate can be determined by measuring the pressure drop across the two fluid resistor elements. The flow meter also allows for the user to know what flow rate is passing through the analytical column without needing to know the resistance of the column. The flow meter also provides a means to document the flow rate during the chromatographic run. This is very important for validating results in drug testing or other critical applications.

Accuracy of measurement is not affected by solvent gradient runs. Because the resistor elements each have negligible volume (below 50 nanoliters) the residence time of solvents in each path is too small to permit sufficient change in fluid viscosity to alter measurement accuracy.

Another aspect of the invention is the ability to gang multiple controller/meter units together to achieve multi-channel flow splitting. The mass spectrometers that are used with HPLC's are capable of doing analyses in much less time than the HPLC. So, when combining the output of HPLC to LC-MS, the LC-MS must sit idle while the HPLC completes a run. This is a problem because the mass spectrometer systems typically cost 10 times as much as an HPLC pump and column. Prior art devices use multiple pumps working simultaneously to feed samples through multiple columns for sample separation, and then into the mass spectrometer for final analyses (the mass spec is multiplexed). The present invention allows a single HPLC pump to split flow multiple ways into multiple branches, and then into the mass spectrometer. Each branch includes a pressure transducer, a signal conditioner, and an ADC feeding a digital computing device. The computing device also controls an actuator driver that operates a servo device to selectively vary the variable resistance valve described above. This arrangement provides a great cost savings as well as an important improvement in overall system reliability (an 8 channel system would normally have 32 check valves, 16 high pressure seals, and is very prone to down time).

DETAILED DESCRIPTION OF THE INVENTION

Figure 1:
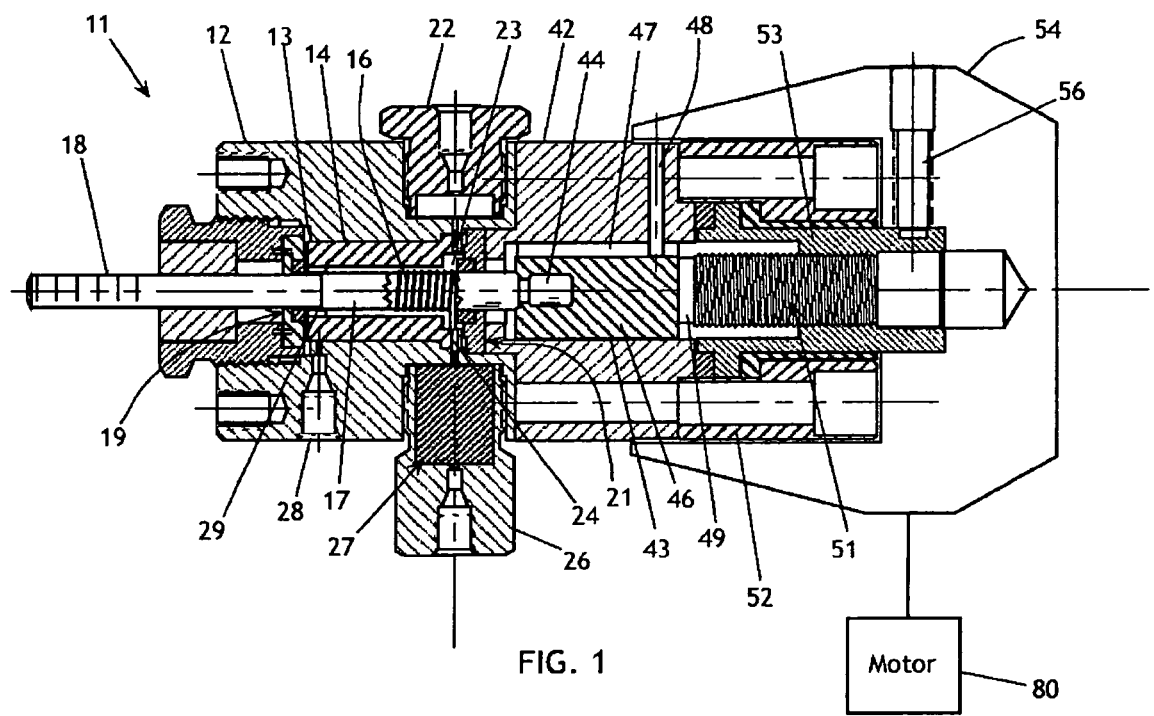
FIG. 1 is a cross-sectional view of the adjustable flow resistance valve of the present invention, shown in the maximum flow resistance disposition.

The present invention generally comprises a method and apparatus for controlling and regulating the high pressure, low flow systems used in HPLC and the like. With regard to FIG. 1, a major aspect of the invention comprises an adjustable flow rate valve 11 for such high pressure, low flow systems. The valve 11 includes a valve body 12 having a stepped bore 13 extending generally axially therethrough. A sleeve 14 of stainless steel or the like is secured within the bore 13, and a helical groove 16 is formed in the inner circumferential surface of the sleeve. The axial extent of the helical groove 16 (shown in breakaway in FIG. 1) is substantially the entire length of the sleeve. A restrictor shaft 17 is press fit into the sleeve 14, the outer surface of the shaft 17 impinging on the inner circumferential surface of the sleeve and sealing the helical groove 16 to define an enclosed helical capillary fluid flow path through the groove 16. The length of the flow path may be many times larger than the length of the sleeve 14, and the long path tends to negate any variations in effective diameter over the length of the flow path. An extension 18 of the shaft 17 extends outwardly therefrom, and is provided with indicia that indicate a liquid flow ratio, as will be described in the following. High pressure seal assemblies 19 and 21 are secured at opposed ends of the sleeve 14 to contain the high pressure liquid fed through the device.

A high pressure input fitting 22 is secured in the valve body 12, and is connected through a small passage 23 to a flow space at the inner end of the helical groove 16. Another high pressure input fitting 26 is secured to the body 12, and a fixed flow resistance cartridge 27 is incorporated within the fitting 26. The fitting 26 communicates through passage 24 to the flow space at the inner end of the groove 16. This arrangement permits high pressure liquid to be input through fitting 22, the liquid flow being split so that some of the flow proceeds through groove 16 and the remainder of the flow goes through passage 26 and fixed flow resistance 27 to a low flow output branch, as will be described further below.

The fluid resistance of the flow path through groove 16 is selected by adjusting the length of the flow path. This is accomplished by changing the length of engagement of the restrictor shaft 17 with the helical flow path 16. Secured to body 12 is a valve body extension 42, which includes a central bore 43 aligned with bore 13. Restrictor shaft 17 includes a head 44 that is secured within a drive block 46, and block 46 is axially translatable within bore 43. Block 46 is provided with a longitudinally extending groove 47, and pin 48 extends from component 42 to the groove 47 to prevent rotation of block 46. Shaft 49 extends axially from block 46, and is provided with fine drive threads 51.

Figure 2:
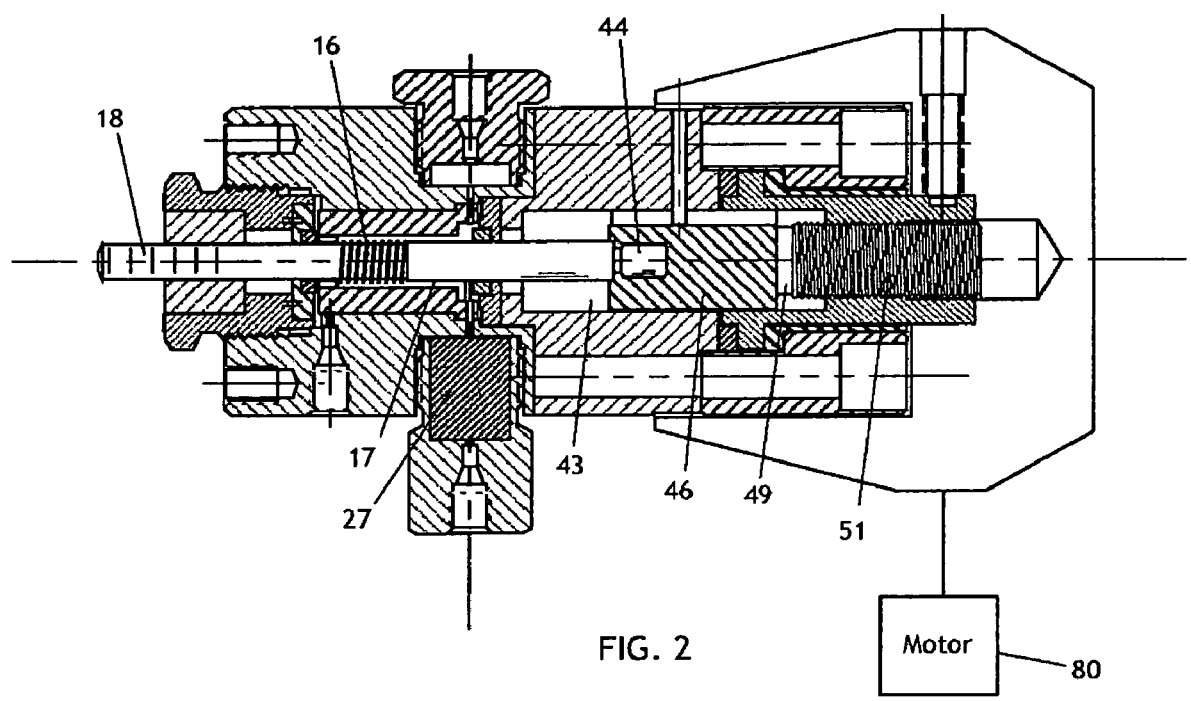
FIG. 2 is a cross-sectional view of the adjustable flow resistance valve of FIG. 1, shown in a reduced flow resistance disposition.

A cap assembly 52 is secured coaxially to the extension 42, and supports a rotatable collar 53 that has internal threads adapted to engage drive threads 51. Adjustment knob 54 is secured about the cap assembly 52, and pin 56 joins the knob to the collar 53 for rotation in common. Thus the knob may be rotated to turn the collar 53 so that the threads 51 move the drive block axially and translate the restrictor shaft axially. FIG. 2 depicts the device 11 with the restrictor shaft 17 translated partially outwardly (to the right in FIG. 2) so that a portion of the helical groove 16 is unsealed, reducing the length of the capillary flow path so that the fluid flow resistance is reduced concomitantly. It may be appreciated that the knob 54 may be replaced by a motorized rotational drive, such as a stepper motor, for automated flow adjustment.

The restrictor shaft 17 is preferably formed of a ceramic material so that the press fit thereof into the sleeve 14 does not create spalling or other surface disruptions that could introduce contamination and particulate debris into the flow stream.

The fixed fluid flow resistance 27 may comprise any convenient construction known in the prior art. One preferred embodiment may comprise a helical groove formed in the receptacle that receives the cartridge 27, the cartridge 27 serving to seal the helical groove and form a helical capillary flow path in a fashion similar to the components 14, 16, and 17, although the non-movable cartridge 27 defines a fixed, non-adjustable flow path having a fixed resistance. A number of fittings 26 may be provided, each having a cartridge 27 with a different known fluid flow resistance, whereby fittings 26 may be interchanged to selectively modify the fixed resistance and the low flow output.

Figure 4:
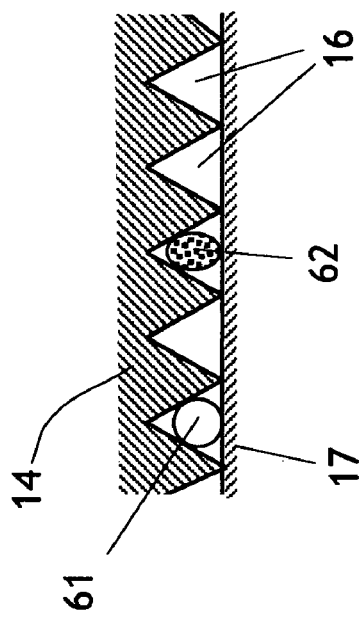
FIG. 4 is a magnified cross-sectional view of the triangular groove flow path of the adjustable flow resistance valve of the invention.

With regard to FIG. 4, the groove 16 in the sleeve 14 is defined by a 60° equilateral triangle. The groove has a flow resistance approximately the same as a capillary tube 61 having a diameter that fits within the 60° triangle, yet the triangular configuration has the advantage of permitting the passage of particulates, such as oblong particle 62, that are larger than the diameter of the tubular capillary 61. Thus clogging of the flow path is minimized. The hydraulic radius of a triangular groove is given by the relationship:

$$\text{Hydraulic radius} = \frac{\text{(cross sectional area)}}{\text{(wetted perimeter)}}$$

$$\text{Area of triangular groove} = \frac{\text{Base} \times \text{Height}}{2}$$

$$\text{Wetted perimeter} = 3 \times \text{Base}$$

$$\text{Hydraulic radius} = h/6$$

The equivalent diameter of a circular groove=4×hydraulic radius or 2h/3. A conduit of circular cross section h would provide the same pressure drop as a 60° triangular groove of depth=1.5 h. Therefore, since most particles have irregular shapes, there is less chance for clogging to occur in the 60° triangular groove.

Figure 3:
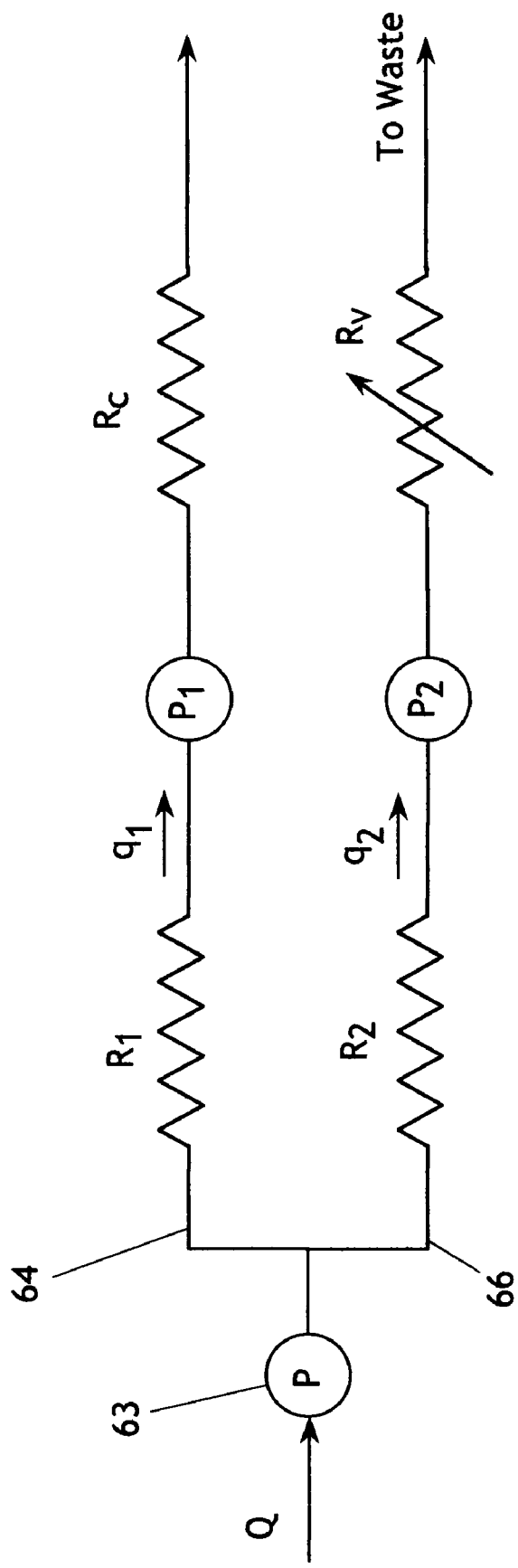
FIG. 3 is a schematic diagram of the flow metering circuit of the present invention.

Another salient feature of the invention is a flow meter that can be employed to adjust and measure the flow rates in a HPLC arrangement. With regard to FIG. 3, a high pressure pump 63 delivers a flow Q to two parallel branches 64 and 66. Branch 64, a low flow path, is comprised of a fluid resistance $R_1$ having a flow $q_1$ therethrough and a pressure drop $P_1$, which is connected to the analytical column having an unknown flow resistance $R_c$. Branch 66, a high flow path, is comprised of a fluid resistance $R_2$ having a flow $q_2$ therethrough and a pressure drop $P_2$, which is connected to the adjustable flow resistance $R_v$ of the device 11 described above. $R_1$ may comprise the fixed, known flow resistance of cartridge 27 of the device 11. The following relationships pertain to the calculation of flow rate through the column:

$$Q = q_1 + q_2$$

$$q_1 = \frac{(P - P_1)}{\mu R_1}$$

$$q_2 = \frac{(P - P_2)}{\mu R_2}$$

$$q_1 = \frac{R_2(P - P_2)Q}{R_1(P - P_2) + R_2(P - P_1)}$$

It is apparent that viscosity is not a factor in calculating the flow rates, and a process monitoring device may be easily programmed to calculate the flow rates in real time based on measured parameters P, $P_1$ and $P_2$. The flow meter also allows for the user to know what flow rate is passing through the analytical column without needing to know the resistance of the column. The flow meter also provides a means to document the flow rate during a chromatographic run.

Figure 5:
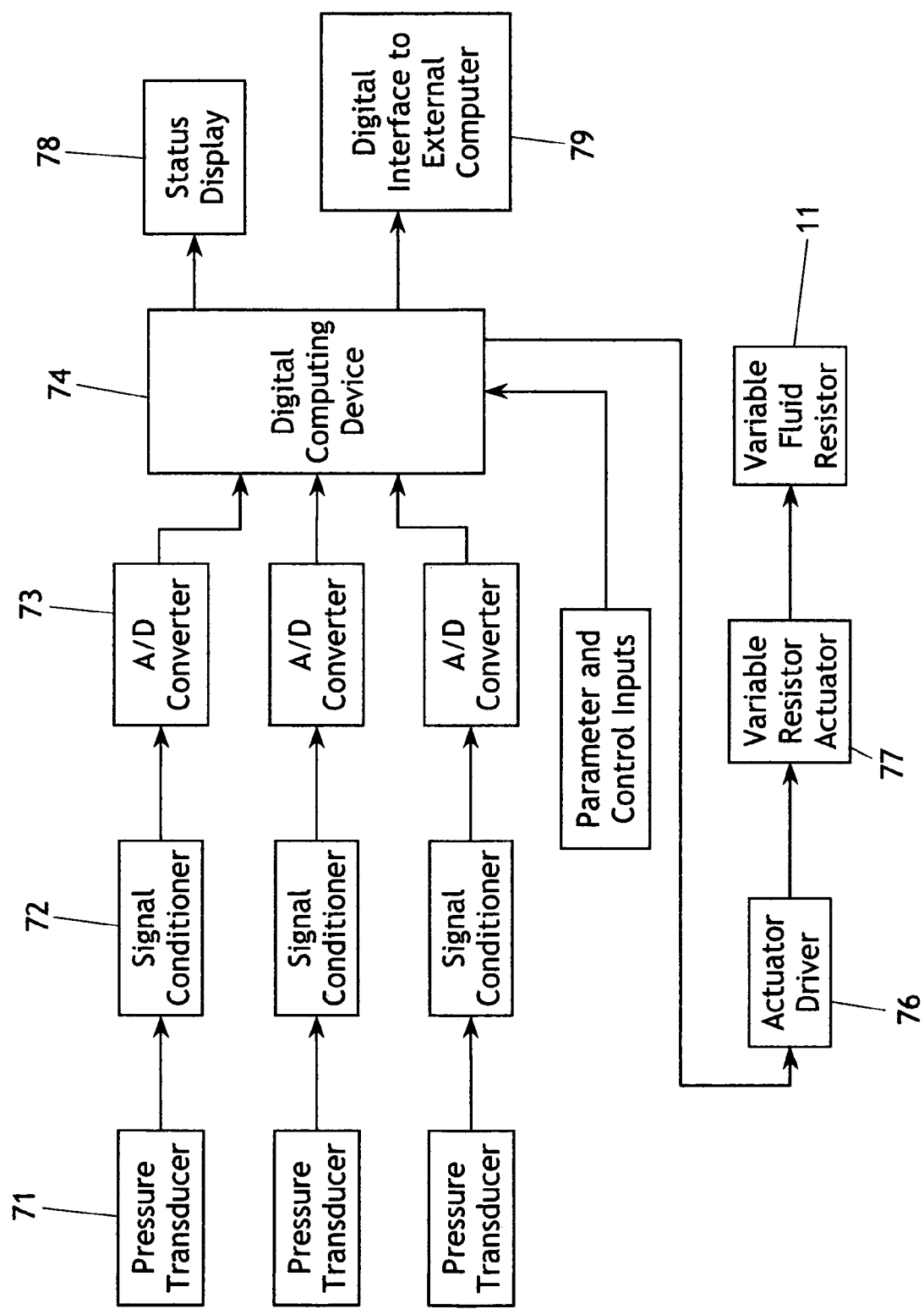
FIG. 5 is a functional block diagram of a multi-channel flow splitting arrangement for a plurality of ganged flow metering circuits.

Another salient feature of the present invention is that it allows a single HPLC pump to split flow multiple ways into multiple branches, and then into the mass spectrometer. With regard to FIG. 5, each branch includes a pressure transducer 71, a signal conditioner 72, and an A/D converter 73 feeding a digital computing device 74. The computing device 74 is programmed to control an actuator driver 76 that operates a servo device 77 (such as a stepper motor 80) to selectively vary the variable resistance valve 11 described above. A status display 78 and an interface 79 to an external computer for data collection and monitoring may also be provided. This arrangement provides a great cost savings as well as an important improvement in overall system reliability.

The foregoing description of the preferred embodiment of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

The invention claimed is:

1. An adjustable resistance device for high pressure, low flow rate liquids, including:
   a sleeve having an internal surface;
   a groove extending into said internal surface of said sleeve;
   a restrictor shaft disposed within said sleeve, said restrictor shaft having an outer circumferential surface impinging on said internal surface of said sleeve and forming a seal with said groove to define a flow path within said groove;

means for translating said restrictor shaft within said sleeve to selectively unseal portions of said groove and change the length of said flow path within said groove;

said means for translating including threaded means connected to one end of said restrictor shaft; and, means for preventing rotation of said restrictor shaft while permitting axial translation of said restrictor shaft.

2. An adjustable resistance device for high pressure, low flow rate liquids, including:

a sleeve having an internal surface;

a groove extending into said internal surface of said sleeve;

a restrictor shaft disposed within said sleeve, said restrictor shaft having an outer circumferential surface impinging on said internal surface of said sleeve and forming a seal with said groove to define a flow path within said groove;

means for translating said restrictor shaft within said sleeve to selectively unseal portions of said groove and change the length of said flow path within said groove;

said means for translating including threaded means connected to one end of said restrictor shaft;

said threaded means including a threaded drive shaft connected to said restrictor shaft, and further including a rotatable collar connected to said sleeve, said collar having internal threads to engage said threaded drive shaft; and, said rotatable collar connectable to a motor drive.

3. An adjustable resistance device for high pressure, low flow rate liquids, including:

a sleeve having an internal surface;

a groove extending into said internal surface of said sleeve;

a restrictor shaft disposed within said sleeve, said restrictor shaft having an outer circumferential surface impinging on said internal surface of said sleeve and forming a seal with said groove to define a flow path within said groove;

means for translating said restrictor shaft within said sleeve to selectively unseal portions of said groove and change the length of said flow path within said groove;

a sealed first flow space disposed at a first end of said groove;

a high pressure input fitting connected to said first flow space;

a low flow output fitting connected to said first flow space, wherein said low flow output fitting includes a fixed fluid resistance therein;

a sealed second flow space disposed at a second end of said groove, a high flow output fitting connected to said second flow space, said fixed fluid resistance having a flow resistance greater than the flow resistance of said flow path through said groove; and, an indicator shaft extending outwardly from said restrictor shaft to indicate the ratio of flow rate through said fixed flow resistance compared to flow rate through said flow path.

* * * * *